Aug. 5, 1941.  L. G. MESSMAN  2,251,595
HAY DERRICK
Filed Jan. 23, 1940  3 Sheets-Sheet 1

Inventor
Leon G. Messman
By Clarence A. O'Brien
and Hyman Berman
Attorneys

Aug. 5, 1941.  L. G. MESSMAN  2,251,595
HAY DERRICK
Filed Jan. 23, 1940  3 Sheets-Sheet 2

Inventor
Leon G. Messman
By Clarence A. O'Brien
and Hyman Berman
Attorneys

Aug. 5, 1941. L. G. MESSMAN 2,251,595
HAY DERRICK
Filed Jan. 23, 1940 3 Sheets-Sheet 3
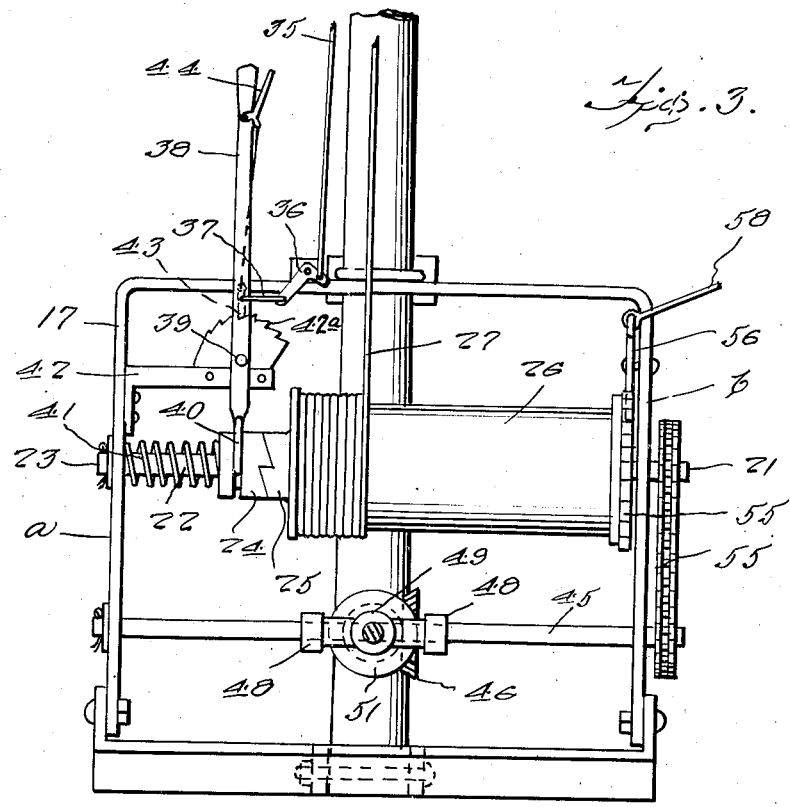
Fig. 3.
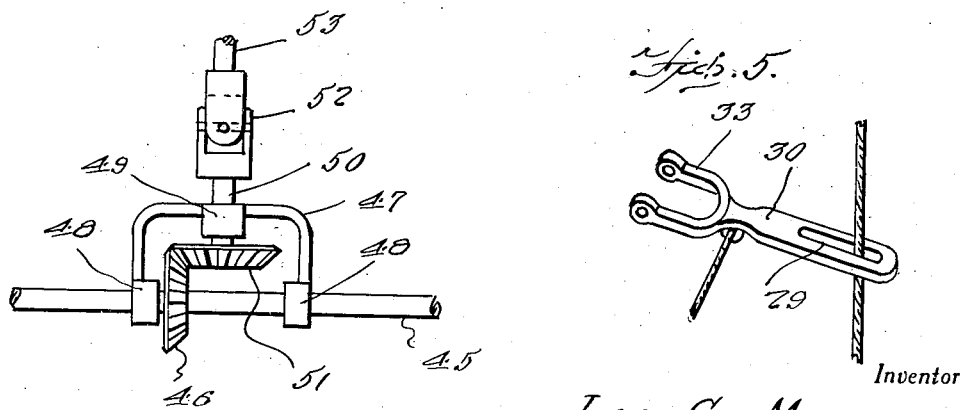
Fig. 5.
Fig. 4.
Inventor
Leon G. Messman
By Clarence A. O'Brien
and Hyman Berman
Attorneys Patented Aug. 5, 1941

2,251,595

UNITED STATES PATENT OFFICE 2,251,595

HAY DERRICK

Leon G. Messman, Rensselaer, Ind., assignor of one-half to Leonard A. Rajal, Rensselaer, Ind.

Application January 23, 1940, Serial No. 315,233

1 Claim. (Cl. 254—173)

This invention appertains to new and useful improvements in material handling and more particularly to a novel derrick or hoist for hay and like material.

The principal object of the present invention is to provide a hay derrick with which hay can be lifted into wagons or to form stacks in a convenient and quick manner.

Another important object of the invention is to provide a hay derrick in which the various parts are positive acting and not susceptible to the ready occurrence of defects.

Still another important object of the invention is to provide a derrick which is power driven, which will require a minimum amount of manual effort.

Other objects and advantages of the invention will become apparent to the reader of the following specification.

In the drawings:

Figure 3 is a rear elevational view of the control means.

Figure 4 is a fragmentary plan view of the drive connection.

Figure 5 is a fragmentary perspective view showing the automatic clutch lever.

Figure 6 is a perspective view of the drum and clutch shaft.

Figure 1:
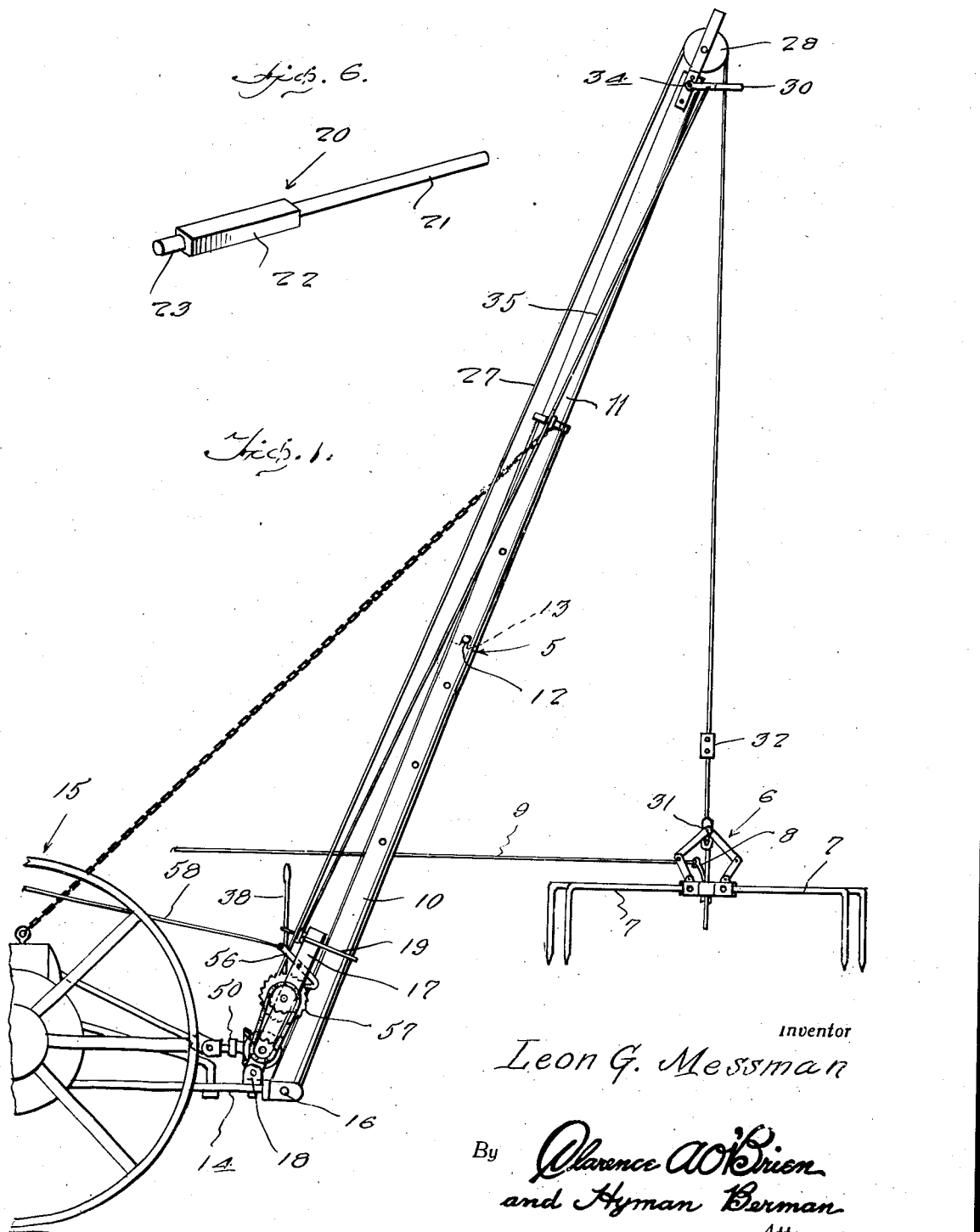
Figure 1 represents a side elevational view of the derrick.
Figure 2:
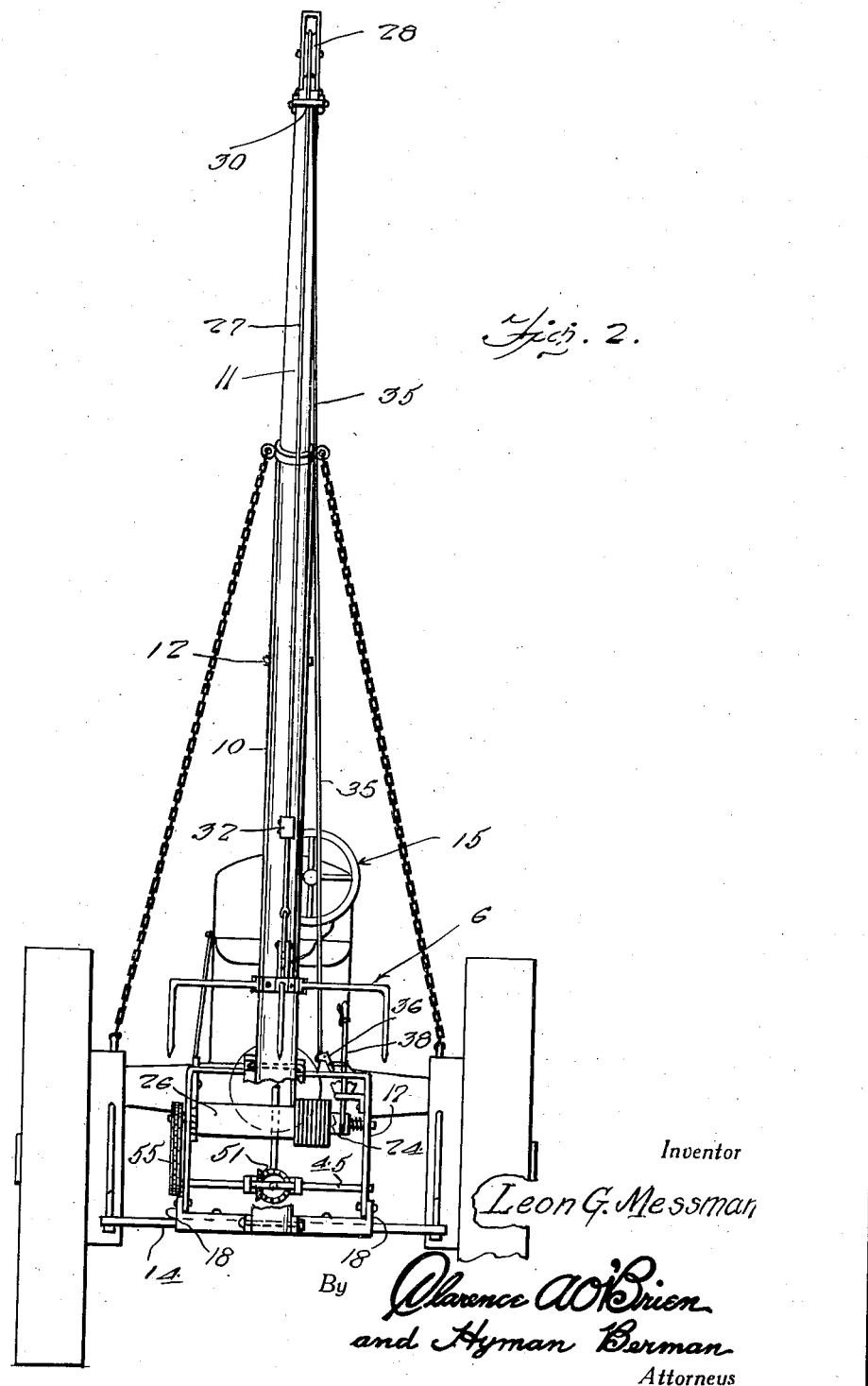
Figure 2 is a front elevational view.

Referring to the drawings, wherein like numerals designate like parts, it can be seen that numeral 5 generally refers to derrick proper, while numeral 6 generally refers to a conventional hay fork of the trip type. This fork 6 includes tines 7 and a trip mechanism including a trip lever 8 from which a line 9 extends to a point adjacent the operator's seat.

The boom consists of a lower hollow section 10 and an extensible section 11. The upper section 11 has notches 13 in the lower portion thereof to receive a cross pin 12 disposed through selected openings of the boom section 10 when the lower portion of the section 11 is disposed in the lower section 10. Thus the section 11 is adjustable with respect to the section 10, and the section 10 is pivotally connected to the frame or chassis 14 of a tractor generally referred to by numeral 15, as at 16.

A U-shaped frame 17 is pivotally connected to the ears 18 on the chassis frame 14 and a U-shaped clamp 19 serves to secure the upper portion of the frame 7 to the boom section 10.

A shaft, generally referred to in Figure 6 by numeral 20, consists of an elongated round shaft portion 21 merging with a square shaft portion 22 which has at its remaining end a pintle extension 23.

This pintle extension 23 is journalled through side portion $a$ of the frame 17, while the free end of the portion 21 is journalled through the opposite side portion $b$ of the frame 17. On the square portion 22 of the shaft 20 is slidably disposed a toothed clutch collar 24 which is cooperative with a fixed clutch collar 25 on the adjacent end of a drum 26, onto which is wound a cable 27, this cable representing the lifting cable which extends upwardly and over the pulley 28 mounted at the upper end of a boom section 11. This cable extends downwardly from a pulley 28 and through an elongated slot 29 in an automatic clutch lever 30 to connect to the fork 6 as at 31.

On the fork end portion of the cable 27 is a block 32 which is engageable against the lever 30 to operate the clutch 24 automatically.

The lever 30 is provided with a fork 33 which straddles the upper portion of the boom section 11 and is pivotally connected thereto as at 34.

Extending downwardly from the intermediate portion of the lever 30 is a control cable 35 which extends to a bell-crank 36 mounted on the upper portion of the frame 17. The cable 35 connects to one end of the bell-crank 36 while the other end of the bell-crank 36 is connected by the link 37 to the intermediate portion of a hand lever 38. The lower portion of the hand lever 38, which is pivotally mounted as at 39, is forked as at 40 and adapted to straddle a grooved portion of the clutch section 24.

A compression spring 41 is provided on the squared portion 22 of the shaft 20 between the frame leg $a$ and the clutch section 24.

As shown in Figure 3, a ratchet segment 42a is mounted on a bracket 42 within the frame 17 and is engaged by the latch member 43 which is controlled by a handle 44 on the hand lever 38.

A shaft 45 has its ends journalled through the leg portions $a$—$b$ of the frame 17 and (see Fig. 4) has the bevel gear 46 on its intermediate portion.

A U-shaped frame 47 has bearings 48 through which the shaft 45 is disposed and a third intermediate bearing 49 through which the stub shaft 50 is journalled, this stub shaft 50 having a bevel gear 51 meshing with a gear 46. A universal joint 52 connects the stub shaft 50 with a drive shaft 53 from the tractor 15.

The drive is from the tractor power take-off shaft 53, by way of the universal connection 52 to the stub shaft 50 and the gears 51 and 46 to the shaft 45. From the shaft 45, the drive is by way of the chain 55 connecting the sprockets on the shafts 45 and 21 to drive the shaft 21 which is connected to the drum 26 by way of the clutch 24—25. Operation of the drum 26 results in lowering or lifting of the cable 27 and the fork 6.

In the event the fork 6 lifts too high, the block 32 will engage the lever 30, pulling upwardly on the cable 35 with the result that the bell-crank 36 will be rocked and will pull the hand lever 38 to the right in Figure 3, resulting in disengagement of the clutch section 24 from the clutch 25, thus removing the power from the drum 26, which will be held by the dog 56 riding the ratchet wheel 57 on the drum 26. Obviously, the dog 56 can be controlled by the cable 58 which extends to a point adjacent the operator's seat (not shown).

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A derrick comprising a boom, a material lifter, a drum, a cable extending from the drum to the lifter and extending over the boom, a drive to the drum, a clutch between the drive and the drum, said clutch including a movable clutch element, a rockable hand lever operatively connected with the movable clutch element, a detent for the hand lever, a bell-crank, a connection between the bell-crank and the hand lever, a pivoted and slotted member at the upper end of the boom through which the cable is ridable, a connection between the pivoted member and the bell-crank adapted to operate the bell-crank and release the clutch when the pivoted member is lifted, and an enlargement on the lifter attached cable adjacent the lower end thereof adapted to engage and lift the pivoted member when the lifter approaches the pivoted member.

LEON G. MESSMAN.